United States Patent
Ji et al.

(10) Patent No.: US 10,808,985 B2
(45) Date of Patent: Oct. 20, 2020

(54) SENSING MODULE AND REFRIGERATOR INCLUDING SAME

(71) Applicant: LG INNOTEK CO., LTD., Seoul (KR)

(72) Inventors: Chil Young Ji, Seoul (KR); Jeong Gi Seo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 143 days.

(21) Appl. No.: 15/555,801

(22) PCT Filed: Mar. 4, 2016

(86) PCT No.: PCT/KR2016/002218
§ 371 (c)(1),
(2) Date: Sep. 5, 2017

(87) PCT Pub. No.: WO2016/140555
PCT Pub. Date: Sep. 9, 2016

(65) Prior Publication Data
US 2018/0045452 A1 Feb. 15, 2018

(30) Foreign Application Priority Data

Mar. 5, 2015 (KR) .................. 10-2015-0030692

(51) Int. Cl.
*F25D 11/00* (2006.01)
*F25D 17/08* (2006.01)
(Continued)

(52) U.S. Cl.
CPC ............ *F25D 21/02* (2013.01); *F25D 11/00* (2013.01); *F25D 17/08* (2013.01); *F25D 23/02* (2013.01);
(Continued)

(58) Field of Classification Search
CPC ........ H01L 27/14; G01N 25/56; G01N 25/64; G01N 27/121; G01N 27/223;
(Continued)

(56) References Cited

U.S. PATENT DOCUMENTS 6,756,793 B2* 6/2004 Hirono ............... G01R 27/2605
324/690
8,434,317 B2* 5/2013 Besore .................... F25D 21/04
165/231
(Continued)

FOREIGN PATENT DOCUMENTS

CN 101512268 8/2009
CN 102519214 6/2012
(Continued)

OTHER PUBLICATIONS

Borkholder, Cell based Biosensors using Microelectrodes, Nov. 1998, Standford University, pp. 80-82 (Year: 1998).*
(Continued)

*Primary Examiner* — Elizabeth J Martin
*Assistant Examiner* — Chang H Park
(74) *Attorney, Agent, or Firm* — Ked & Associates, LLP

(57) ABSTRACT

A sensing module according to an embodiment includes: a substrate; a sensing electrode formed on a first surface of the substrate; a reaction layer formed on the first surface of the substrate and burying an upper surface of the substrate and the sensing electrode; a driving unit electrically connected to the sensing electrode formed on the first surface of the substrate and processing a sensing signal transmitted through the sensing electrode; and a protective layer formed surrounding the driving unit, wherein an impedance value of the reaction layer is changed by an external contact material,
(Continued)

and the sensing electrode transmits the sensing signal with respect to the impedance value of the reaction layer to the driving unit.

17 Claims, 16 Drawing Sheets

(51) Int. Cl.
| | |
|---|---|
| *F25D 21/02* | (2006.01) |
| *F25D 23/02* | (2006.01) |
| *F25D 25/00* | (2006.01) |
| *F25D 29/00* | (2006.01) |
| *G01N 27/02* | (2006.01) |

(52) U.S. Cl.
CPC ............. *F25D 25/00* (2013.01); *F25D 29/00* (2013.01); *G01N 27/02* (2013.01); *F25B 2700/11* (2013.01); *F25D 29/005* (2013.01)

(58) Field of Classification Search
CPC ... G01N 27/225; G01N 27/02; F25B 2700/11; F25D 11/00; F25D 17/08; F25D 21/02; F25D 23/02; F25D 25/00; F25D 29/00; F25D 29/005
USPC ............. 257/414; 73/335.03, 335.04, 335.05
See application file for complete search history.

(56) References Cited

U.S. PATENT DOCUMENTS

| | | | |
|---|---|---|---|
| 9,291,383 B2* | 3/2016 | Besore | F25D 21/02 |
| 10,407,028 B2* | 9/2019 | Ji | G01N 27/223 |
| 2008/0093226 A1 | 4/2008 | Briman et al. | |
| 2008/0221806 A1* | 9/2008 | Bryant | G01N 27/127 |
| | | | 702/22 |
| 2009/0198117 A1 | 8/2009 | Cooper et al. | |
| 2009/0320509 A1 | 12/2009 | Görz et al. | |
| 2011/0100039 A1 | 5/2011 | Kim et al. | |
| 2011/0214442 A1 | 9/2011 | Visin et al. | |
| 2013/0241385 A1 | 9/2013 | Lee et al. | |
| 2014/0159560 A1* | 6/2014 | Jung | F25D 23/028 |
| | | | 312/405 |

FOREIGN PATENT DOCUMENTS

| | | |
|---|---|---|
| CN | 103471325 | 12/2013 |
| CN | 103842751 | 6/2014 |
| EP | 2 418 444 | 2/2012 |
| EP | 2 426 444 | 3/2012 |
| JP | H06-3035 | 1/1994 |
| JP | H08-254375 | 10/1996 |
| KR | 10-0169614 | 1/1999 |
| KR | 10-2009-0006518 | 1/2009 |
| KR | 10-2011-0139977 | 12/2011 |
| KR | 10-1481489 | 1/2015 |
| KR | 101669678 B1 * | 10/2016 |

OTHER PUBLICATIONS

Zhang et al., Carbon nanotube in different shapes, Jun. 2009, materiastoday, vol. 12, No. 6, p. 15 (Year: 2009).*
International Search Report (with English Translation) and Written Opinion dated Jun. 16, 2016 issued in Application No. PCT/KR2016/002218.
European Search Report dated Jan. 23, 2018 issued in Application No. 16759191.6.
Chinese Office Action dated Aug. 6, 2019 issued in CN Application No. 201680026056.1.

* cited by examiner (a)

(b)

SENSING MODULE AND REFRIGERATOR INCLUDING SAME

CROSS-REFERENCE TO RELATED PATENT APPLICATIONS

This application is a U.S. National Stage Application under 35 U.S.C. § 371 of PCT Application No. PCT/KR2016/002218, filed Mar. 4, 2016, which claims priority to Korean Patent Application No. 10-2015-0030692, filed Mar. 5, 2015, whose entire disclosures are hereby incorporated by reference.

TECHNICAL FIELD

The present invention relates to a sensing module and a refrigerator including the same, and more particularly, to a sensing module capable of sensing frost and moisture and a refrigerator including the same.

BACKGROUND ART

In the case of a conventional refrigerator, in order to prevent dew formation on a surface of the refrigerator due to increased humidity of the space where the refrigerator is installed, a heater is installed in the easy area where outside air and inside air are in contact with each other to prevent the generation of frost or moisture, and the heater is driven periodically to remove frost or moisture.

In general, a heater having such a function is mounted near an edge of a refrigerator door or near an ice chute where ice is discharged. In addition, a bottom-freezer type refrigerator, that is, a refrigerator compartment is opened and closed by a pair of pivotable doors, and in a refrigerator of a type without a separate partition wall at a portion where the pair of doors are in contact with each other, the heater may be mounted on the portion where the pair of doors faces each other.

In the case of a conventional refrigerator, since it is difficult to determine whether the actual external condition is a heater driving condition in which frost is generated or humidity is high, the heater should be operated at all times or periodically even in the case where the heater is not in the driving condition. As a result, consumers had to bear a burden of electric charges because of unnecessary electricity consumption.

In addition, a humidity sensor and a temperature sensor are mounted to calculate outside humidity and temperature of a refrigerator, and when the heater is driven to prevent condensation because an ambient temperature is lower than the dew point temperature, both the humidity sensor and the temperature sensor as described above should be mounted, thereby causing an increase in a price of a product.

[Patent document] Japanese Patent No. 1996-254375.

DISCLOSURE

Technical Problem

In an embodiment, there is provided a sensing module for sensing a generation of frost or moisture, and a refrigerator capable of driving a heater only when the frost or moisture above a critical point is generated through the sensing module.

In addition, in an embodiment, there is provided a sensing module capable of sensing a generation of frost or moisture using a carbon micro-coil device and a refrigerator including the same.

The technical problems to be solved in the proposed embodiments are not limited to the technical problems mentioned above, and other technical problems not mentioned may be clearly understood by those skilled in the technical field to which the embodiments proposed from the description below belong.

Technical Solution

A sensing module according to an embodiment includes: a substrate; a sensing electrode formed on a first surface of the substrate; a reaction layer formed on the first surface of the substrate and burying an upper surface of the substrate and the sensing electrode; a driving unit electrically connected to the sensing electrode formed on the first surface of the substrate and processing a sensing signal transmitted through the sensing electrode; and a protective layer formed surrounding the driving unit, wherein an impedance value of the reaction layer is changed by an external contact material, and the sensing electrode transmits the sensing signal with respect to the impedance value of the reaction layer to the driving unit.

In addition, the reaction layer includes a carbon micro-coil material.

Further, the reaction layer includes a carbon micro-coil material, a resin, and a dispersant.

Furthermore, the reaction layer is disposed on the substrate on which the sensing electrode having a predetermined thickness is formed.

In addition, the sensing electrodes are formed in plural number, wherein each of the plurality of sensing electrodes includes a first electrode part disposed in an edge region of the substrate and a second electrode part extending in a longitudinal direction of the substrate from one end of the first electrode part, and the internal angle between the first electrode and the second electrode parts is an obtuse angle.

In addition, the sensing module further includes a via formed through the substrate, wherein one end of the via is connected to the sensing electrode, and the other end is connected to the driving unit.

In addition, a refrigerator according to an embodiment includes: a body having an accommodation space therein; a sensing device accommodated in the accommodation space inside the body and not exposed to the outside of the body; and a heater accommodated in the accommodation space of the body and spaced apart from the sensing device by a predetermined space, wherein the sensing device is formed of a conductive material having a property which an impedance value changes due to a material contacting a surface.

Furthermore, the sensing device includes a substrate, a sensing electrode formed on the upper surface of the substrate, a reaction layer formed on the substrate, burying the upper surface of the substrate and the sensing electrode, and formed of a conductive material having a property which an impedance value is changed by the contact material, and a driving unit formed on a bottom surface of the substrate and sensing a change in impedance of the reaction layer on the basis of a signal transmitted through the sensing electrode.

The refrigerator further includes a shielding plate disposed between the sensing device and the heater in the accommodation space of the body to space apart the sensing device from the heater.

In addition, the reaction layer of the sensing device faces the heater with the shielding plate interposed therebetween.

Further, the reaction layer is formed of a carbon micro-coil material.

In addition, the refrigerator further includes a control unit for sensing a change in impedance of the sensing device, determining whether a generation degree of frost constituting the contact material is greater than a critical point, and driving the heater according to the determination result.

Further, the sensing device is disposed on at least one of an upper end portion, a center portion, and a lower end portion of the inner surface of the body.

Furthermore, the sensing device is disposed in the entire region of the inner surface of the body.

In addition, the refrigerator further includes: a main body in which at least one storage compartment is formed; a first door and a second door opening and closing the at least one storage compartment; and a pillar rotatably coupled to the first door by a hinge and preventing leakage of cold air from the storage compartment between the first door and the second door, wherein the body accommodating the sensing device and the heater is the pillar.

In addition, the refrigerator further includes: a main body in which at least one storage compartment is formed; a first door and a second door opening and closing the at least one storage compartment; an ice making compartment mounted on a rear surface of at least one of the first and the second doors or inside the storage compartment; a dispenser mounted on a front surface of at least one of the first and second doors to extract ice stored in the ice making compartment; and an ice-discharge duct connecting a bottom surface of the ice-making compartment and a top surface of the dispenser, wherein the body accommodating the sensing device and the heater is the ice-discharge duct.

In addition, the refrigerator further includes: a main body in which at least one storage compartment is formed; a first door and a second door opening and closing the at least one storage compartment; and a home bar including a frame mounted on an inner rim of an opening of at least one of the first and second doors, a home bar door rotatably mounted on a front surface of the frame, and a home bar case mounted on a rear surface of the door, wherein the body accommodating the sensing device and the heater is the frame constituting the home bar.

Further, according to an embodiment of the present invention, there is provided a refrigerator including a main body having at least one storage compartment; a first door and a second door opening and closing the at least one storage compartment; a pillar rotatably coupled to the first door by a hinge to prevent leakage of cold air from the storage compartment between the first door and the second door; a sensing device mounted inside the pillar; and a heater mounted inside the pillar and spaced apart from the sensing device by a predetermined distance, wherein the sensing device includes a substrate; a sensing electrode formed on an upper surface of the substrate; a reaction layer formed on the substrate, burying the upper surface of the substrate and the sensing electrode, and formed of a conductive material having a property of changing an impedance value depending on frost generation on a surface; and a driving unit formed on a lower surface of the substrate and sensing a change in impedance of the reaction layer on the basis of a signal transmitted through the sensing electrode.

Furthermore, the sensing device is mounted inside the pillar and is not exposed to the outside of the pillar.

In addition, the reaction layer is a carbon micro-coil consisting of a hydrocarbon-based material.

In addition, the refrigerator further includes a control unit for driving the heater when frost is generated greater than a critical point depending on a change in impedance of the reaction layer.

Advantageous Effects

According to an embodiment of the present invention, when frost or moisture is generated greater than a critical point, the power consumption may be reduced by instantly reacting therewith to drive the heater for the necessary time only.

In addition, according to an embodiment, the heater is driven at the time when frost or moisture is generated greater than the critical point, not a periodic driving of the heater, and thus it is possible to efficiently drive the heater scattered in a refrigerator and to minimize unnecessary decrease of a cooling effect.

MODES OF THE INVENTION

Figure 1:
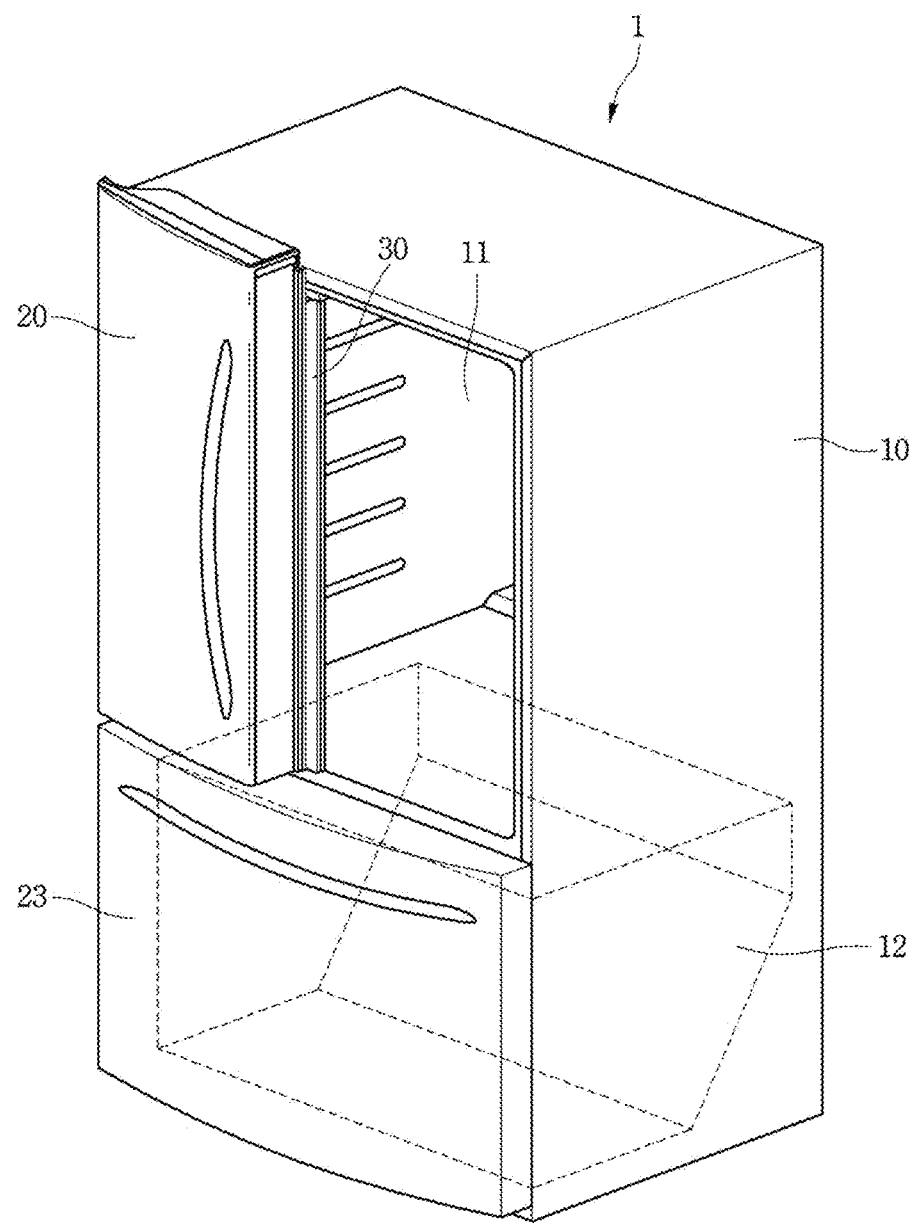
FIG. 1 is a perspective view of a refrigerator according to an embodiment of the present invention.

Hereinafter, exemplary embodiments of the present invention that are easily performed by those skilled in the art will be described in detail with reference to the accompanying drawings. However, the present invention may be implemented in various different forms and is not limited to the embodiments described herein. Further, elements which do not relate to the detail description are not shown in the drawings to clearly describe the present invention, and similar elements in the following description are designated by similar reference numerals.

In the following description, when there is an expression that some portion "includes" some structural elements, this means that some portion does not exclude another structural element, but may further include another structural element unless stated to the contrary.

In the drawings, thicknesses may be exaggerated to clearly explain various layers and regions, and similar elements in the following description are designated by similar reference numerals. It will be understood that when a portion of a layer, a film, a region, a plate or the like is referred to as being "on" another portion, it can be "directly formed on" another portion, or a third portion can be interposed between the portions. Otherwise, when a portion is "directly formed on" another portion, it means that there is no third portion between the portions.

For reference, the present invention may also be applicable to a refrigerator having side-by-side-opening type doors without any one of a freezer compartment or a refrigerator compartment and may also be applicable to a refrigerator having side-by-side doors opening horizontally as well as opening vertically. Therefore, the present invention may also be applicable to a refrigerator in which a side gasket assembly for sealing a gap between doors is closely installed to a portion facing each other on both doors.

Figure 2:
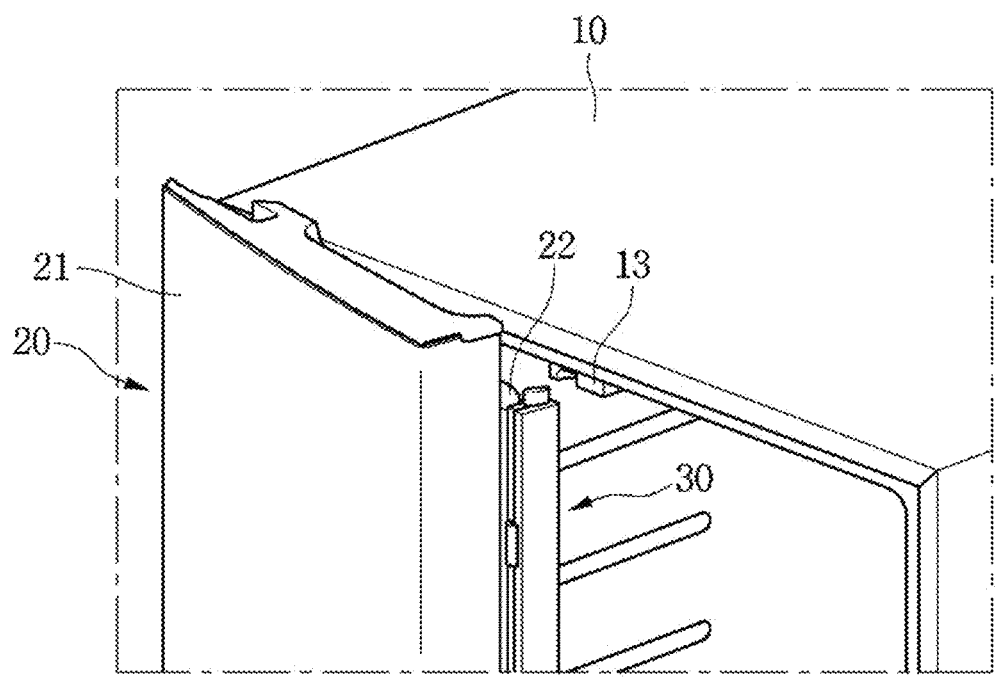
FIG. 2 is a partial perspective view of a refrigerator in which a first refrigerator compartment door of the present invention is opened.

FIGS. 1 and 2 illustrate a state in which a second refrigerator compartment door is removed.

Referring to FIGS. 1 and 2, a refrigerator 1 of an embodiment of the present invention may include a main body 10 in which a refrigerator compartment 11 and a freezer compartment 12 are formed, a plurality of refrigerator compartment doors rotatably connected to the main body 10 by a hinge assembly for opening and closing the refrigerator compartment 11, and a freezer compartment door 23 for opening and closing the freezer compartment 12.

The plurality of refrigerator compartment doors may include a first refrigerator compartment door 20 rotatably connected to the left portion of the main body 10 and a second refrigerator compartment door (not shown) rotatably connected to the right portion of the main body 10. That is, in the embodiment of the present invention, the first refrigerator compartment door 20 and the second refrigerator compartment door may be arranged horizontally. In some cases, the plurality of refrigerator compartment doors may have one or more additional doors in addition to the two doors.

For example, the freezer compartment door 23 may be opened and closed by a sliding type. That is, the freezer compartment door is, for example, a drawer-type door.

A pillar 30 may be provided on any one of the first refrigerator compartment door 20 and the second refrigerator compartment door. When the plurality of refrigerator compartment doors close the refrigerator compartment 11, the pillar 30 functions to prevent the cool air in the refrigerator compartment 11 from flowing out between the plurality of refrigerator compartment doors.

In FIG. 1 illustrates a first refrigerator compartment door 20 provided with a pillar (30) as an example.

The first refrigerator compartment door 20 may include an outer case 21, and a door liner 22 connected to the outer case 21. The pillar 30 may be rotatably connected to the door liner 22.

The refrigerator compartment 11 may be provided with a holder 13 capable of accommodating an upper end portion of the pillar 30. For example, the holder 13 may be disposed on an upper wall of the refrigerator compartment 11. As another example, the holder 13 may be disposed on a lower wall of the refrigerator compartment 11, and a lower end portion of the pillar 30 may be accommodated in the holder 13.

When the first refrigerator compartment door 20 is closed, the pillar 30 may be unfolded by interaction with the holder 13. Accordingly, the pillar 30 blocks the communication between the refrigerator compartment 11 and the gap between the plurality of refrigerator compartment doors. That is, the holder 13 guides the pillar 30 so as to be rotatable.

On the other hand, when the first refrigerator compartment door 20 is opened, the pillar 30 is folded by the interaction with the holder 13.

In the present description, the state of the pillar 30 as shown in FIG. 1 may be a state in which the pillar 30 is unfolded, and the state of the pillar 30 as shown in FIG. 2 may be a state in which the pillar 30 is folded.

In the embodiment of the present invention, when the pillar 30 is folded as shown in FIG. 2, since a rotation is prevented by a locking device (to be described later), the pillar 30 is not unfolded until the first refrigerator compartment door 20 is closed.

Hereinafter, the structure of the pillar 30 of the embodiment of the present invention will be described in detail.

Figure 3:
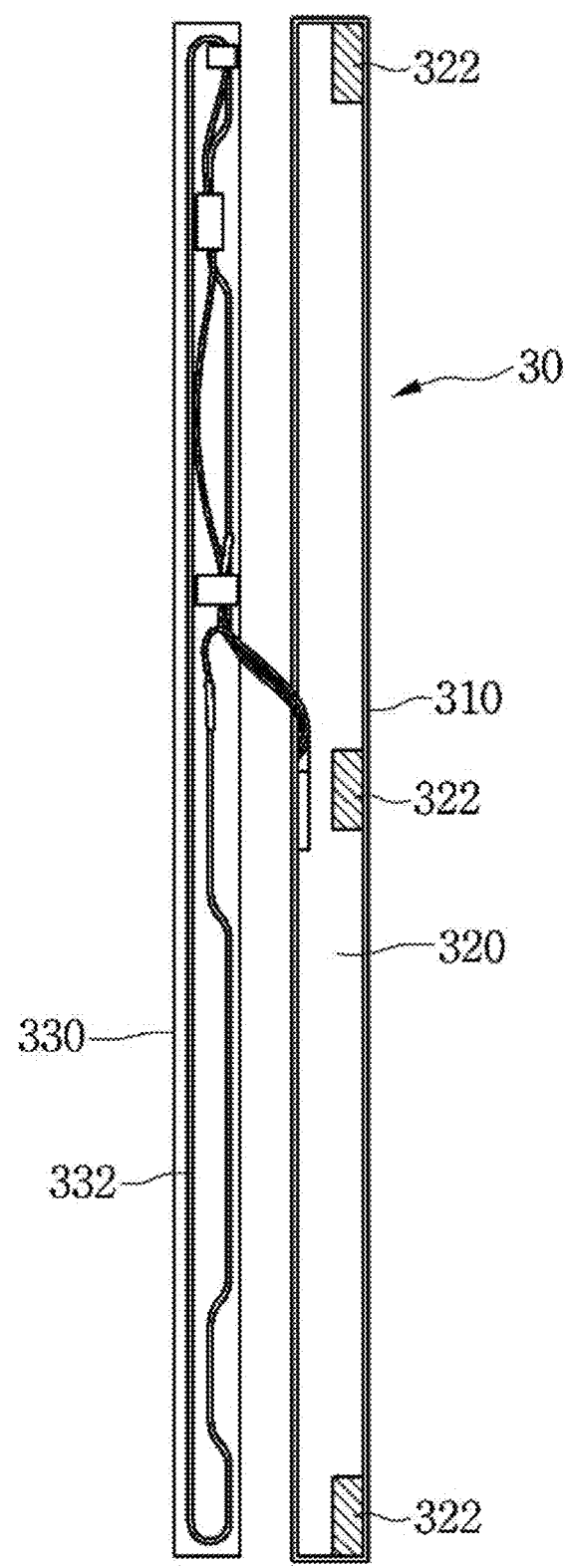
FIG. 3 is a view illustrating a configuration of a pillar according to a first embodiment of the present invention.
Figure 4:
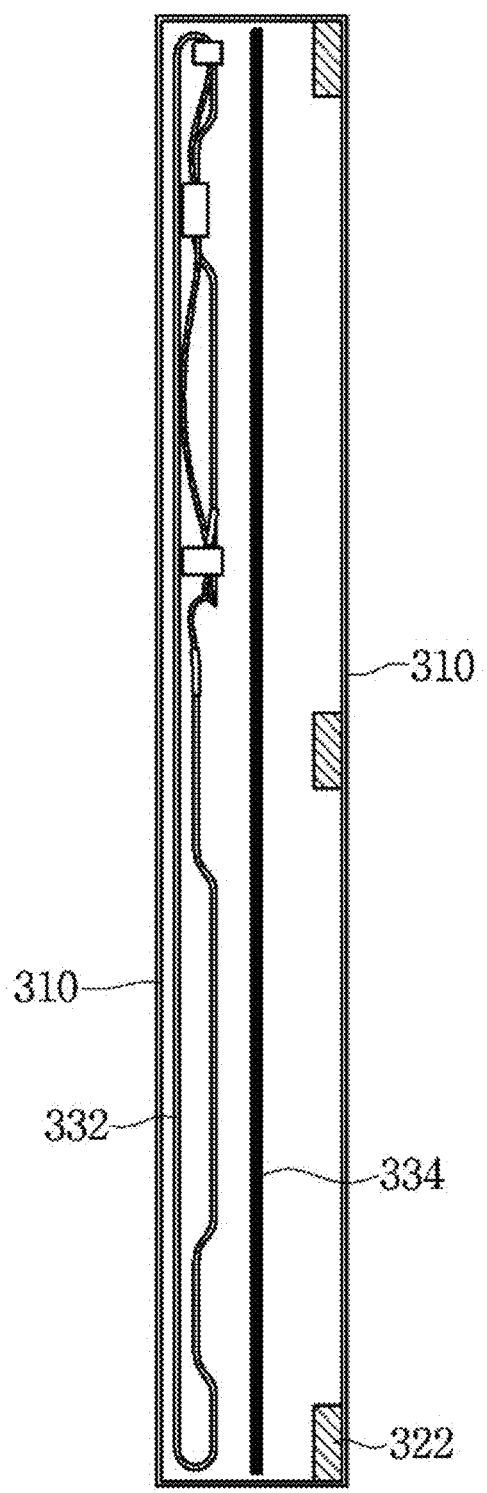
FIG. 4 is a view illustrating a configuration of a pillar according to a second embodiment of the present invention.
Figure 5:
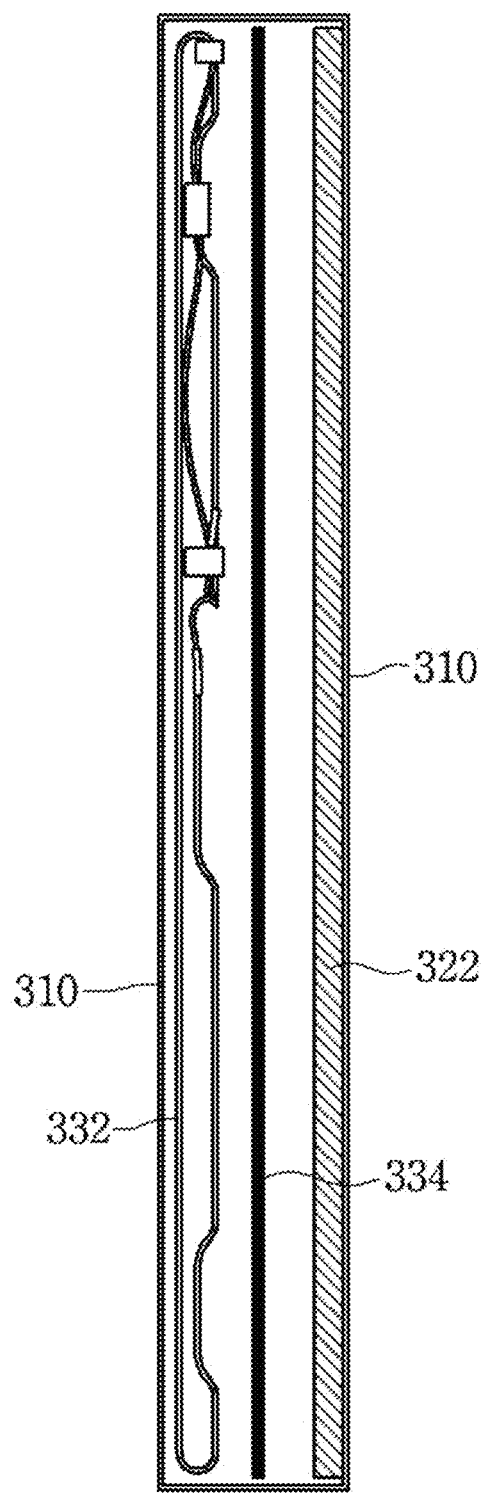
FIG. 5 is a view illustrating a configuration of a pillar according to a third embodiment of the present invention.

FIG. 3 is a view illustrating a configuration of a pillar according to a first embodiment of the present invention, FIG. 4 is a view illustrating a configuration of a pillar according to a second embodiment of the present invention, and FIG. 5 is a view illustrating a configuration of a pillar according to a third embodiment of the present invention.

Referring to FIG. 3, the pillar 30 may include a pillar body 310 and a pillar cover 330 coupled to the pillar body 310.

The pillar 30 may further include a sensing device 322 and a heat insulating material 320 accommodated in the pillar body 310.

In addition, a heater 332 may be provided in the pillar cover 330 for preventing the frost-fitting on the pillar 30.

Thus, the heater 332 may contact the heat insulating material 320 in a state where the pillar cover 330 is coupled to the pillar body 310.

In the embodiment of the present invention, the heater 332 is positioned between the heat insulating material 320 and the pillar cover 330 when the first refrigerator compartment door 20 is closed. Accordingly, the heat insulating material 320 blocks the heat generated from the heater 332 from being transferred to the refrigerator compartment 11.

In addition, the sensing device 322 is buried in the pillar 30.

The sensing device 322 senses whether the pillar 30 has frost or moisture, and outputs a sensing signal thereby.

The sensing device 322 is buried in the pillar 30 and is not exposed to the outside, thereby sensing a state of generation of frost or moisture generated in the pillar 30.

At this point, the sensing device 322 may be mounted at a plurality of positions within the pillar 30.

That is, the sensing device 322 is mounted in a place where frost may be generated due to temperature and humidity difference between the outside air and the inside air, in other words, a region where a contact between the cold air and the outside air is frequent.

Accordingly, the sensing device 322 may be mounted on the pillar 30 as described above.

That is, in the case of the bottom-freezer type refrigerator as described above, the refrigerator compartment is opened and closed by a pair of pivotable doors. In addition, both side ends of each of the pair of pivotable doors may be defined as a fixed end rotatably coupled to the main body 10 and a rotating end corresponding to the opposite side of the fixed end. At this point, the rotating ends of the pair of refrigerator compartment doors come into contact with each other when the refrigerator compartment is closed. Further, there is no separate partition for contacting the rotating end of the refrigerator compartment door inside the refrigerator compartment. Accordingly, a possibility of an outflow of cold air is the highest at a portion where the pair of refrigerator compartment door rotating ends contact each other.

For this reason, a refrigerator compartment door of a bottom freezer type refrigerator is equipped with the pillar 30 as described above to prevent the outflow of cold air. In detail, the pillar 30 is rotatably mounted on any one of the pair of refrigerator compartment doors.

Particularly, the pillar 30 is mounted on a rear surface side of the rotating end of the refrigerator compartment door 20. In addition, the holder 13 for guiding a rotation of the pillar 30 is mounted on a ceiling surface and a bottom surface of a refrigerator compartment. Accordingly, in the process of closing the refrigerator compartment door 20 on which the pillar 30 is mounted, one side of the pillar 30 rotates to close the portion where the pair of refrigerator compartment doors 20 are in contact with each other.

Specifically, when the refrigerator compartment door 20 on which the pillar 30 is mounted is opened, as shown in the figures, the pillar 30 is maintained in parallel with the side portion of the rotating end side of the refrigerator compartment door 20. In addition, when the refrigerator compartment door 20 is closed, the pillar 30 is rotated to 90 degrees by a guide member to be orthogonal to side portion of the rotating end side of the refrigerator compartment door 20. In this state, when the opposite side of the refrigerator compartment door is closed, a rear edge of the rotating end side of the pair of refrigerator compartment doors 20 is in close contact with the pillar 30 to block the outflow of cold air.

At this point, since the contact with the external air frequently occurs in the pillar 30 as described above, a possibility of generating frost is very high.

Accordingly, the sensing device 322 is buried and mounted in the pillar 30.

At this time, the sensing device 322 is disposed at an upper end portion, a lower end portion, and a central portion of the rotating end side of the refrigerator compartment door, respectively, so that the sensing device 322 may sense a generation of frost in each of the disposed regions.

Meanwhile, frost is more likely to be generated at the lower end portion than the upper end portion among the side surfaces of rotating end side of the pair of refrigerator compartment doors. Because the cold air inside the refrigerator compartment is lower in temperature and humidity than the outside air, and the lower the temperature, the more the cold air sinks to the bottom due to the density characteristics of the cold air. Accordingly, in the lower end portion of the door, which is the region where the difference in temperature and humidity between the outside air and the inside air of the refrigerator is the greatest, the possibility of generating frost is the highest, and the amount of generated frost is also the greatest.

Accordingly, the sensing device 322 according to the embodiment of the present invention may be mounted on an upper end portion, a lower end portion, and a central portion of the pillar 30, but be mounted only in the region close to the lower end portion where the possibility of generating frost is the highest.

In addition, referring to FIG. 4, the pillar 30 includes only the pillar body 310 in FIG. 3, not the pillar body 310 and the pillar cover 330.

In the pillar body 310, the sensing device 322 and the heater 332 as described above are provided.

At this point, a shielding plate 334 is provided between the heater 332 and the sensing device 322 to prevent an operation error of the sensing device 322 by the heater 332.

The shielding plate 334 may be formed of an aluminum material.

In addition, the sensing device 322 may be mounted at an upper end portion, a lower end portion, and a center portion of the pillar body 310, respectively. Otherwise, the sensing device 322 may be mounted only at the lower end portion in which a generation degree of frost is the highest.

Further, referring to FIG. 5, the sensing device 322 may be mounted over the entire region of the inner surface of the pillar 30.

At this point, the sensing device 322 includes a carbon micro-coil (CMC) material as will be described later.

Accordingly, the sensing device 322 may be mounted by plating the carbon micro-coil material over the entire region of the inner surface of the pillar 30.

As described above, the sensing device 322 may be mounted on a specific region of the inner surface of the pillar 30, and otherwise the sensing device 322 may be mounted over the entire region of the inner surface of the pillar 30.

In addition, when the sensing device 322 is mounted on a specific region, the sensing device 322 may be mounted on an upper end portion, a lower end portion, and a central portion of the pillar 30, respectively. Otherwise, the sensing device 322 may be mounted only on the lower end portion in which a generation degree of frost is the highest.

Hereinafter, the specific configuration of the sensing device 322 will be described.

Figure 6:
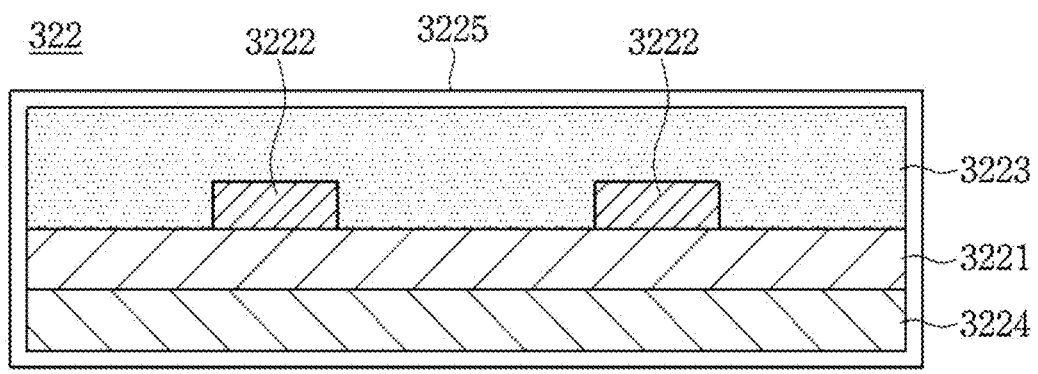
FIG. 6 is a cross-sectional view illustrating a detailed structure of a sensing device according to an embodiment of the present invention.
Figure 7:
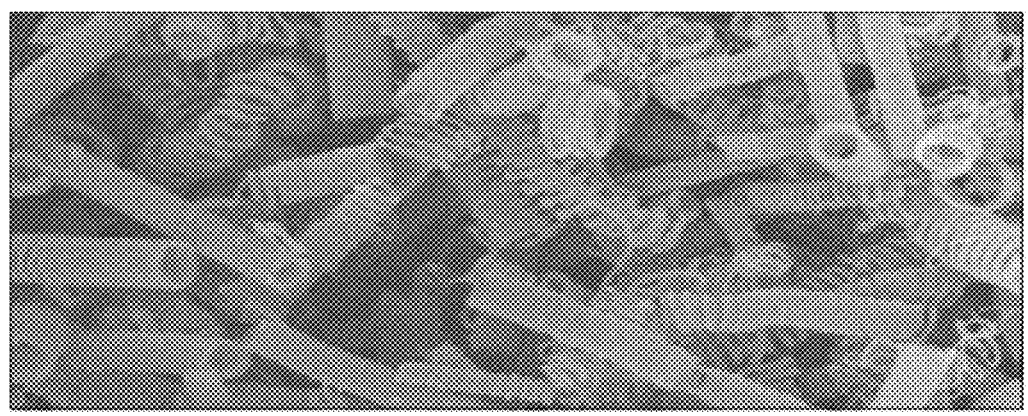
FIG. 7 is a view illustrating a reaction layer 3223 shown in FIG. 6.
Figure 7:
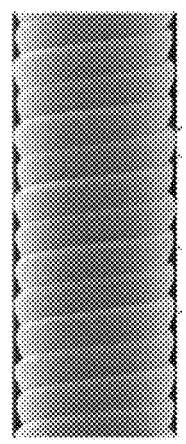
Figure 8:
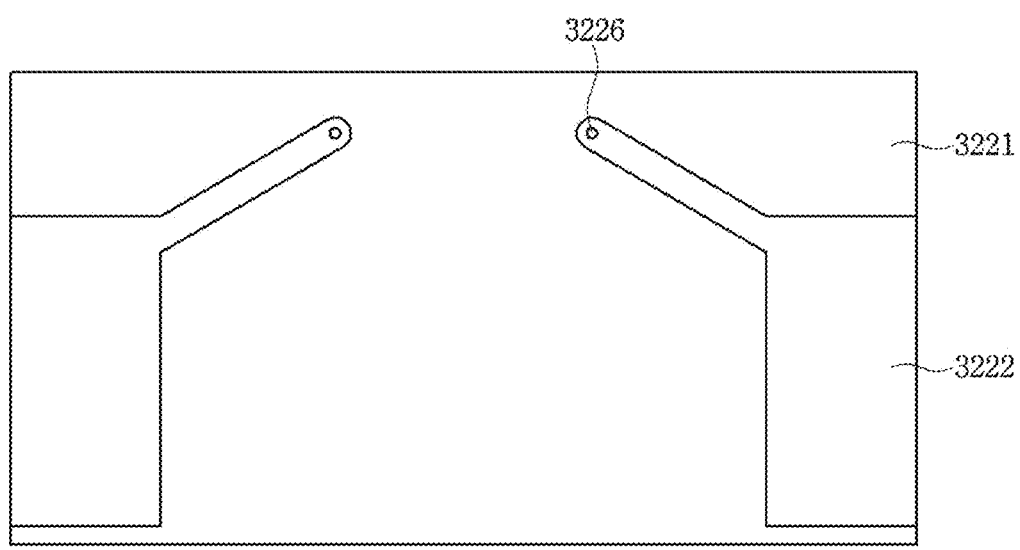
FIG. 8 is a plan view of a sensing electrode 3222 shown in FIG. 6.

FIG. 6 is a cross-sectional view illustrating a detailed structure of a sensing device according to the embodiment of the present invention, FIG. 7 is a view illustrating a reaction layer 3223 shown in FIG. 6 and FIG. 8 is a plan view of a sensing electrode 3222 shown in FIG. 6.

Referring to FIGS. 6 to 8, the sensing device 322 includes a substrate 3221, a sensing electrode 3222, a reaction layer 3223, a driving unit 3224, and a protection layer 3225.

The sensing device 322 as described above senses a change in impedance depending on an amount of generated heat in the region where frost or moisture is generated, and controls the operation of the heater 332.

The substrate 3221 is a base substrate on which the sensing electrode 3222, the reaction layer 3223, and the driving unit 3224 are mounted.

The sensing electrode 3222 is formed on the substrate 3221. The sensing electrode 3222 is formed on an upper surface of the substrate 3221 while being buried by the reaction layer 3223.

The sensing electrode 3222 may be formed in plural number. The reaction layer 3223 senses a change in impedance as the reaction of the reaction layer 3223 occurs due to the material formed on a surface of the reaction layer 3223.

Preferably, the sensing electrode 3222 may include a first sensing electrode having a positive polarity and a second sensing electrode having a negative polarity.

The reaction layer 3223 is formed on the substrate 3221 and is formed by burying the upper surface of the substrate 3221 and the sensing electrode 3222.

Preferably, the reaction layer 3223 is formed on the substrate 3221 having a predetermined thickness and on which the sensing electrode 3222 is formed.

The reaction layer 3223 is formed of a conductive material, and has a property which an impedance changes due to a material attached to a surface.

Preferably, the reaction layer 3223 is a carbon micro-coil (CMC) having a spring shape. That is, the reaction layer 3223 is formed by depositing at least one of hydrocarbons such as acetylene, methane, propane, and benzene on the substrate 3221 by a chemical vapor deposition (CVD) process.

In addition, otherwise, the reaction layer 3223 may be formed using a metal catalyst on the basis of nickel or nickel-iron.

As described above, the CMC, as shown in FIG. 7 may have a shape which is not straight, but is curled like a pig tail and is amorphous carbon fiber with unique structure a fiber material may not have. Further, the CMC has a superelasticity which extends to a length, which is ten times or more that of an original coil.

(a) of FIG. 7A illustrates a coil formed in the reaction layer 3223, and (b) of FIG. is a detailed view of the coil.

Morphology of the reaction layer 3223 has a 3D-helical/ spiral structure, and the crystal structure is amorphous.

In other words, the reaction layer 3223 as described above is formed by growing carbon fibers into a coil shape, and accordingly, the reaction layer 3223 has a cross-sectional structure in which carbon fibers are grown in a coil shape.

That is, a change in impedance of the reaction layer 3223 occurs due to a force applied by a contact of a specific material with the surface of the reaction layer 3223 or a dielectric constant of the specific material.

Furthermore, the sensing electrode 3222 senses a change in impedance of the reaction layer 3223, thereby transmitting a sensing signal corresponding to the impedance change to the driving unit 3224.

The driving unit 3224 is formed on a lower surface of the substrate 3221. Accordingly, the driving unit 3224 checks a generation degree of frost depending on a sensing signal transmitted through the sensing electrode 3222, and generates a control signal for controlling an operation of the heater 332 when a generation degree of frost or moisture exceeds a predetermined critical point.

That is, in general, REAL TERM of a impedance is a resistance, POSITIVE IMAGINARY TERM is an inductance, and NEGATIVE IMAGINARY TERM is a capacitance, and the impedance consists of a summation of the resistance, inductance and capacitance.

Therefore, the sensing device 322, such as a common resistor, an inductor, and a capacitor, also needs a pair of sensing electrodes 3222 so as to detect a change in impedance generated in the reaction layer 3223. The sensing electrode 3222 functions to connect the reaction layer 3223 and the driving unit 3224 while optimizing the sensing characteristics of the reaction layer 3223.

Here, when a specific force is applied to the surface of the reaction layer 3223 or a material having a specific dielectric constant is contacted, the capacitance of the reaction layer 3223 is increased. Accordingly, the resistance value and the inductance value are decreased as opposed to the capacitance.

At this point, the sensed impedance value is a summation of the resistance value, the inductance value, and the capacitance value, and the impedance value is linearly decreased depending on a degree of the force or dielectric constant applied to the surface of the reaction layer 3223.

At this point, the sensing electrode 3222 has a structure as shown in FIG. 8 and is formed on the substrate 3221.

The sensing electrode 3222 includes a first electrode part formed on an edge region of the substrate 3221 and a second electrode part extending from one end of the first electrode part to a central region of the substrate and having a predetermined inclination angle with respect to the one end of the first electrode portion.

That is, a state of change in impedance generated in the reaction layer 3223 changes depending on the shape of the sensing electrode 3222.

Accordingly, in the present invention, in order to optimally adjust the impedance change state of the reaction layer 3223, as described above, the sensing electrode 3222 including the first electrode part and the second electrode part is formed on the substrate 3221.

Meanwhile, a via 3226 is formed at a lower portion of one end of the second electrode part.

The via 3226 is formed by burying a through hole passing through upper and lower surfaces of the substrate 3221 with a metal material.

One end of the via 3226 is connected to the sensing electrode 3222 by passing through the substrate 3221, and the other end of the via 3226 is connected to the driving unit 3224 attached to the lower surface of the substrate 3221.

Meanwhile, the driving unit 3224 is provided with an analog front end (AFE) and is connected to the sensing electrode 3222 through the via 3226.

At this point, the AFE performs a differential amplification function, and there is a difference in the state of change of the impedance according to the generation of the frost depending on whether the differential amplification is positive or negative.

Accordingly, the driving unit 3224 senses a change state of the impedance value based on the reference value according to the differential amplification state, and when a degree of a change state deviates from the critical value, the heater 332 is driven to remove the generated frost.

Hereinafter, the driving step of the heater (332) will be described in more detail.

That is, when frost or moisture is generated, the frost or moisture applies a predetermined force to the reaction layer 3223 configured with the CMC, or a dielectric constant changes. In addition, an impedance change occurs in the reaction layer 3223 depending on the change in the applied force or the dielectric constant.

At this point, the change amount of the impedance may correspond to the generation amount of frost or moisture. That is, the force or the dielectric constant applied to the reaction layer 3223 are increased in proportion to the amount of generated frost or moisture, and the impedance change amount is decreased in inverse proportion to the increase of the dielectric constant or the force.

As described above, when the frost or moisture is generated, a change in impedance of the reaction layer 3223 occurs, and an amplitude change with respect to the internal clock of the driving unit 3224 occurs depending on the impedance change.

Further, a differential signal depending on the differential amplification of the AFE of the driving unit 3224 is output depending on the amplitude change of the internal clock.

Then, when the differential signal is output, the output differential signal is converted into a digital signal and transmitted to a main control unit (not shown) inside the refrigerator.

The main control unit (not shown) determines a generation degree of frost or moisture on the basis of the amount of impedance change depending on the transmitted digital signal, and when the generation degree of the frost or moisture exceeds the critical point, the heater 332 is driven to remove the frost or moisture to the critical point or less.

As described above, when frost or moisture is removed by driving the heater 332, the impedance of the reaction layer 3223 configured with the CMC also increases to an default value. Furthermore, if the impedance is increased to a value close to the default value and the generation degree of frost or moisture decreases to the critical point or less, the main control unit stops the driving of the heater 332.

Figure 9:
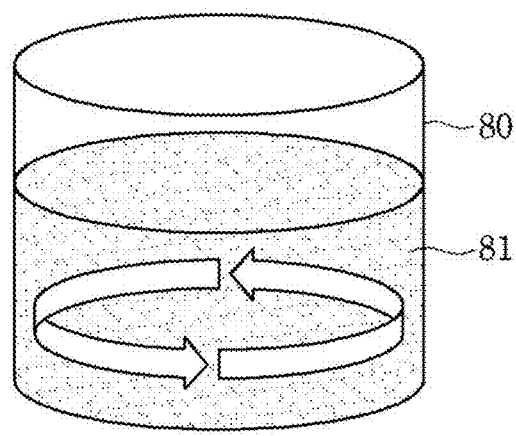
FIG. 9 is a view for explaining a method of manufacturing a sensing device 322 shown in FIG. 6.
Figure 9:
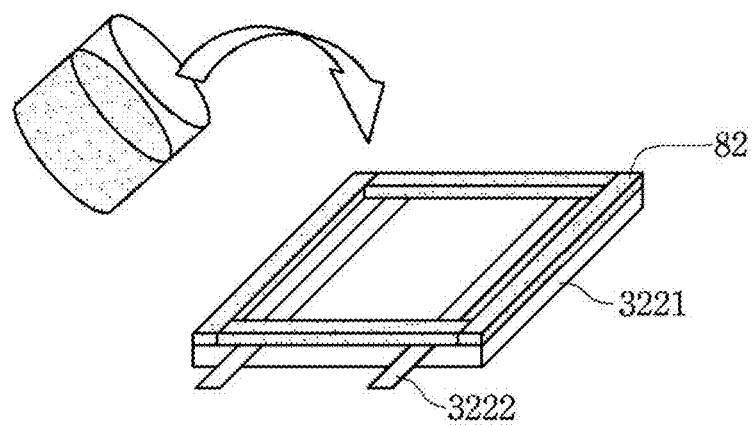
Figure 9:
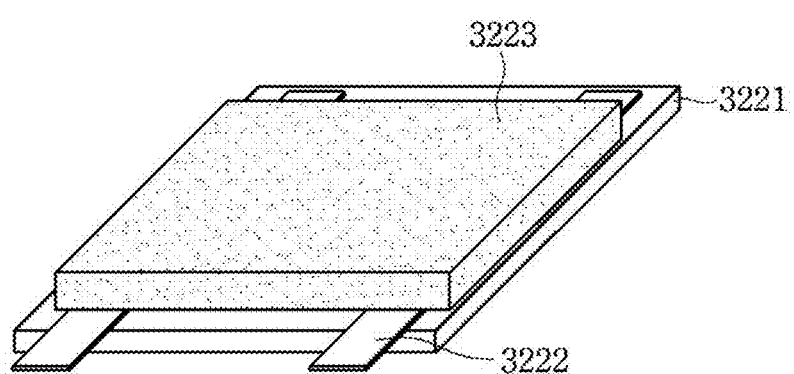

FIG. 9 is a view for explaining a method of manufacturing a sensing device 322 shown in FIG. 6.

Referring to FIG. 9, at first, a solution 81 for forming the reaction layer 3223 is first prepared in a plating tank 80.

The solution 81 may be made of a carbon micro-coil material (CMC material). At this point, the solution 81 may include only carbon micro-coil material, and otherwise, resin and dispersant may be further added.

As described above, in a first step, a carbon micro-coil material and a resin are added and mixed in the plating tank 80, and accordingly, the dispersant is further added and dispersed.

Then, a substrate 3221 is prepared and a sensing electrode 3222 is formed on the prepared substrate 3221.

The sensing electrodes 3222 are formed in plural number, and have a planar structure as shown in FIG. 8.

Then, a frame 82 is formed in the edge region of the substrate 3221. The frame 82 exposes the central region of the substrate 3221 and is formed on the substrate 3221 while covering the edge region of the substrate 3221.

Then, the prepared solution 81 is injected into the frame 82 of the substrate 3221.

In addition, the reaction layer 3223 is formed on the basis of the injected solution 81 through a curing process.

At this point, the curing process may be performed at a temperature of 120° C. for 30 minutes.

According to such a control method, the sensing device 322 may be formed of a carbon micro-coil. Accordingly, the sensing device 322 may sense an impedance value which changes depending on a generation degree of frost or moisture, and the heater 332 may be driven only when the frost or moisture is generated a critical point or more depending on the sensed impedance value. Thus, unnecessary power consumption due to the heater driving can be prevented. Further, according to the control method described above, the heater may be driven only when necessary, and thus the deterioration of the cooling performance, which can be caused by the driving of the heater, can be minimized.

Figure 10:
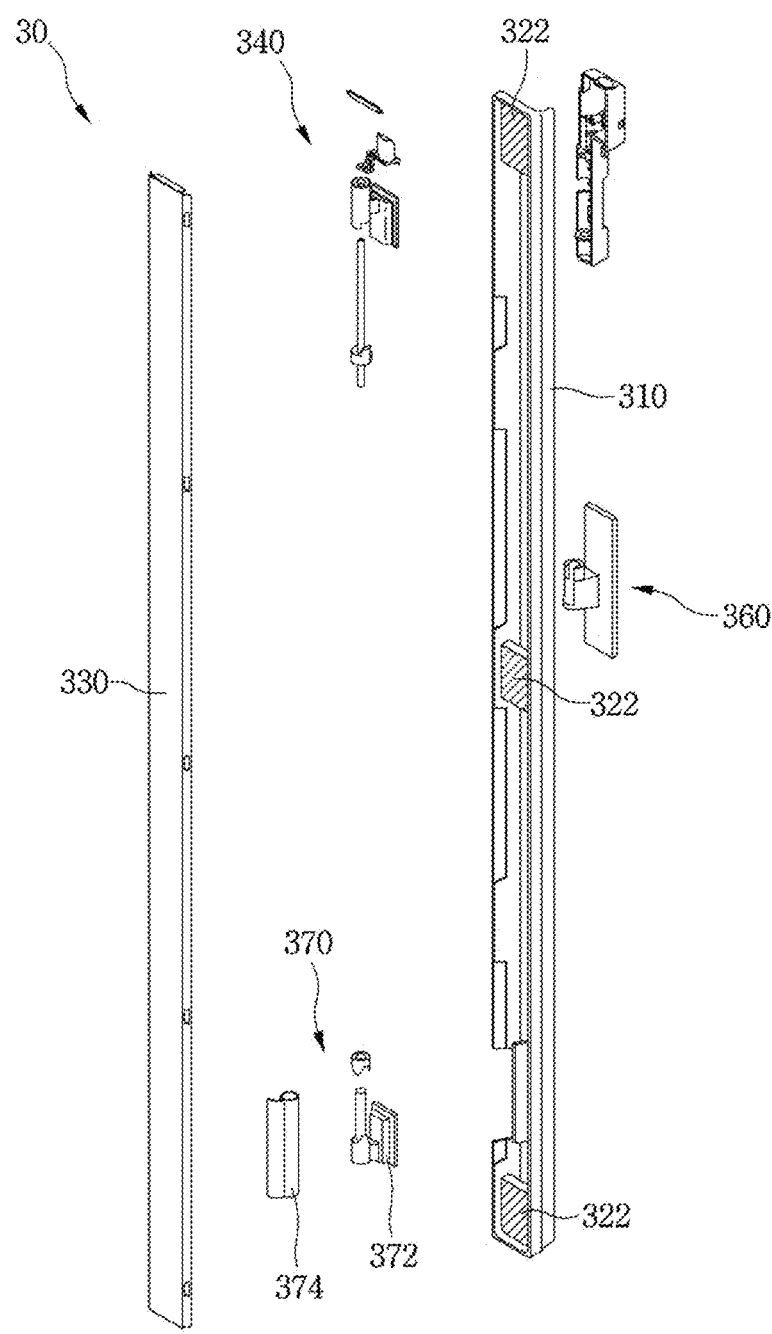
FIG. 10 is an exploded perspective view of a pillar according to an embodiment of the present invention.
Figure 11:
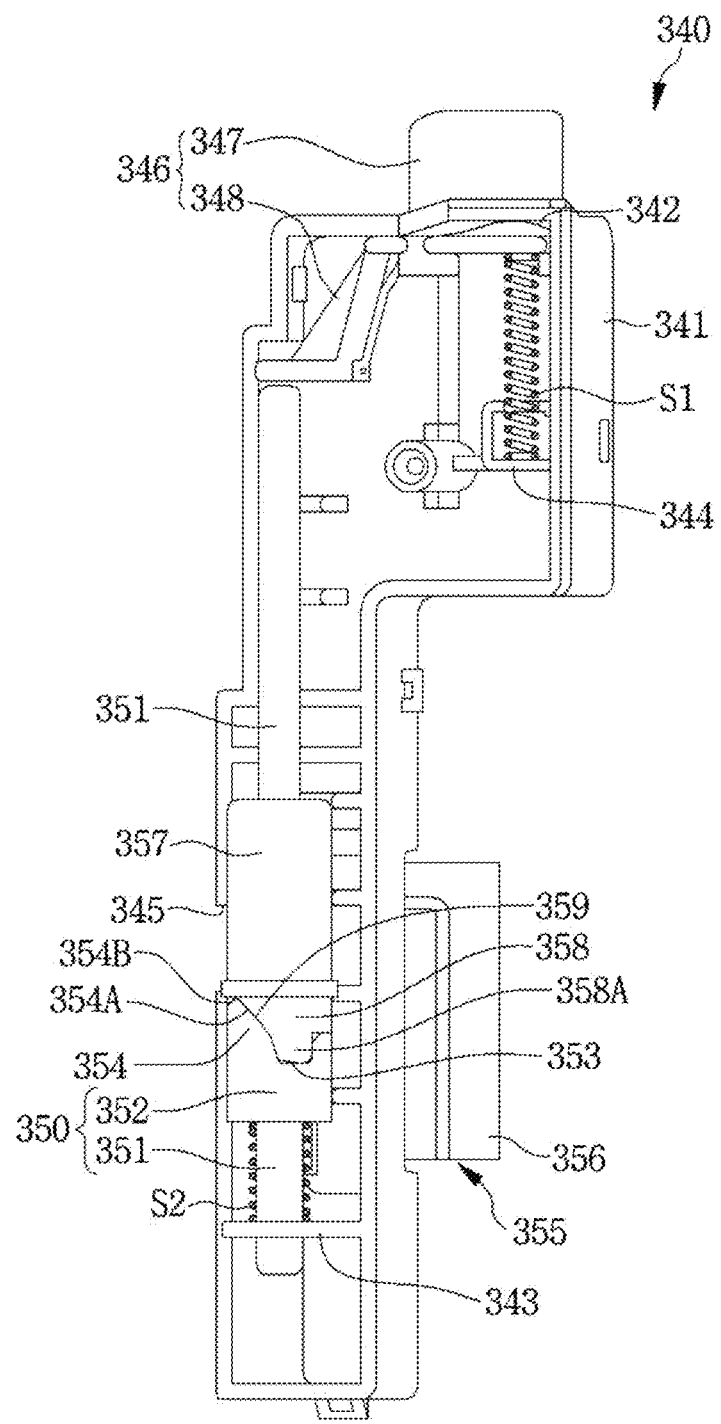
FIG. 11 illustrates a first hinge assembly according to an embodiment of the present invention.

FIG. 10 is an exploded perspective view of a pillar according to an embodiment of the present invention, and FIG. 11 illustrates a first hinge assembly according to an embodiment of the present invention.

Referring to FIGS. 10 and 11, the pillar 30 may further include a plurality of hinge assemblies 340, 360, and 370. The plurality of hinge assemblies 340, 360, and 370 may include a first hinge assembly 340 provided on the upper portion of the pillar 30, a second hinge assembly 360 provided on the center portion of the pillar 30, and a third hinge assembly 370 provided on the lower portion of the pillar 30. In an embodiment of the present invention, as an example, the pillar 30 includes three hinge assemblies. However, the number of the hinge assemblies is not limited to an embodiment of the present invention. However, for a smooth rotation of the pillar 30, it is preferable that a plurality of the hinge assemblies are provided. For example, the hinge assemblies may be provided on the upper and lower portions of the pillars 30, respectively.

The third hinge assembly may include a hinge body 372 and a hinge cover 374. A part of the hinge body 372 may be coupled to the door liner 22. The hinge body 372 includes a hinge shaft. The hinge cover 374 covers the hinge shaft in a state where the hinge shaft is seated on the pillar body 310.

The electric wire connected to the heater 332 may be drawn out to the outside passing through the second hinge assembly 360.

The first hinge assembly 340 (which may be briefly referred to as a "hinge") may include a hinge body 355, a rotation shaft 350 rotatably connected to the hinge body 355, and an actuator 346 for moving the rotation shaft 350. The rotation shaft 350 may be rotated with respect to the hinge body 355 together with the pillar 30.

The hinge body 355 may include a coupling part 356 coupled to the door liner 22 and a shaft connecting part 357 to which the rotation shaft 350 is connected. The coupling part 356 may be coupled to a side surface of the door liner 22.

The first hinge assembly 340 may further include a mounting part 341 on which the rotation shaft 350 and the actuator 346 are mounted. The mounting part 341 may be combined to the pillar body 310 as an example. As another example, the mounting part 341 may be integrally formed with the pillar body 310.

The mounting part 341 may be formed with an opening 345 through which a connection portion between the shaft connecting part 357 and the coupling part 356 may pass.

A part of the actuator 346 may protrude to the outside of the mounting part 341 while the actuator 346 is seated on the mounting part 341. In addition, the actuator 436 may be moved by an external force. That is, the actuator 346 is movably provided inside the pillar 30, and a part of the actuator 346 may protrude upward.

The actuator 346 may include a protrusion part 347, which may be accommodated in the holder 13, and a pressing part 348, which extends downward from the protrusion part 347.

The rotation shaft 350 is disposed under the pressing part 348, and the pressing part 348 may selectively press the rotation shaft 350 downward.

The protrusion part 347 may be elastically supported by a first elastic member S1. The first elastic member S1 supports the protrusion part 347 in a direction in which the protrusion part 347 protrudes from the mounting part 341. For example, the first elastic member S1 supports the protrusion part 347 upward from a lower side of the protrusion part 347. The first elastic member S1 may be, for example, a coil spring, but it is noted that the first elastic member S1 is not limited to an embodiment of the present invention. As another example, the first elastic member S1 may elastically support the pressing part 348.

The mounting part 341 may be formed with a hole 342 through which the protrusion part 347 passes and a first support part 344 for supporting the first elastic member S1.

The rotation shaft 350 may pass through the shaft connecting part 357. The rotation shaft 350 may include a shaft body 351 passing through the shaft connecting part 357. Thus, the rotation shaft 350 and the hinge body 355 can rotate relative to each other.

The first hinge assembly 340 may further include a locking device for preventing relative rotation between the rotation shaft 350 and the hinge body 355 when the first refrigerator compartment door 20 is opened.

The locking device may include a first locking part 352 protruding from the shaft body 351, and a second locking part 358 formed in the shaft connecting part 357 and interacting with the first locking part 352.

The first locking part 352 is a portion whose diameter is larger than that of the shaft body 351. The first locking part 352 may protrude from the entire circumference of the shaft body 351 or may protrude radially from a part of the shaft body 351. The first locking part 352 may include a first locking groove 353 and a second locking protrusion 354. The second locking part 358 may include a first locking protrusion 358A which may be inserted into the first locking groove 353 and a second locking groove 359 through which the second locking protrusion 354 may be inserted.

The second locking protrusion 354 has a plurality of inclined surfaces 354A and 354B. The plurality of inclined surfaces 354A and 354B are inclined so as to be closer to the second locking groove 359 side. Accordingly, at least a part of the second locking protrusion 354 may be formed in a triangular shape. Correspondingly, the second locking groove 359 also has a plurality of inclined surfaces, and at least a part of the second locking groove 359 may be formed in a triangular shape.

At least a part of the contact surfaces of the first locking groove 353 and the first locking protrusion 358A may be a horizontal plane.

The first locking part 352 may be elastically supported by a second elastic member S2. The mounting part 341 may be formed with a support part 343 for supporting the second elastic member S2. At this point, the rotation shaft 350 may pass through the support part 343, and thus rotation of the rotation shaft 350 is guided.

The second elastic member S2 elastically supports the first locking part 352 in a direction in which the second locking protrusion 354 is inserted into the second locking groove 359. For example, the second elastic member S2 may support the first locking part 352 upward from the lower side of the first locking part 352. The second elastic member S2 may be, for example, a coil spring, but it is noted that the second elastic member S2 is not limited to an embodiment of the present invention.

In an embodiment of the present invention, the rotation shaft 350 extends in a vertical direction. Thus, the rotation shaft 350 may be relatively rotated in a horizontal direction with respect to the hinge body 355.

In addition, when the rotation shaft 350 is pressed, the first locking protrusion 358A is disengaged from the first locking groove 353, and thus the rotation shaft 350 is rotatable together with the pillar 30.

At this point, when the rotational force is removed in a state where the rotation shaft 350 is rotated within a certain angle range in a state where the rotation shaft 350 is pressed, by the plurality of inclined surfaces 354A and 354B of the second locking protrusion 354 and the plurality of inclined surfaces of the second locking groove 359 and the second elastic member S2, the rotation shaft 350 is rotated in a direction in which the second locking protrusion 354 is inserted into the second locking groove 359. Accordingly, the pillar 30 may not be unfolded but remains in a folded state.

That is, according to the present invention, when the rotational force of the pillar 30 is removed in a state in which the pillar 30 is not completely unfolded by the rotational force of the pillar 30, the pillar 30 is returned to a folded state by the first locking part and the second locking part 358. Accordingly, in an embodiment of the present embodiment, the second locking protrusion 354 and the second locking groove 359 may be referred to as a locking guide device for the pillar.

Unlike the embodiment described above, the first locking part 352 may have the shape of the second locking part, and the second locking part 358 may have the shape of the first locking part.

Figure 12:
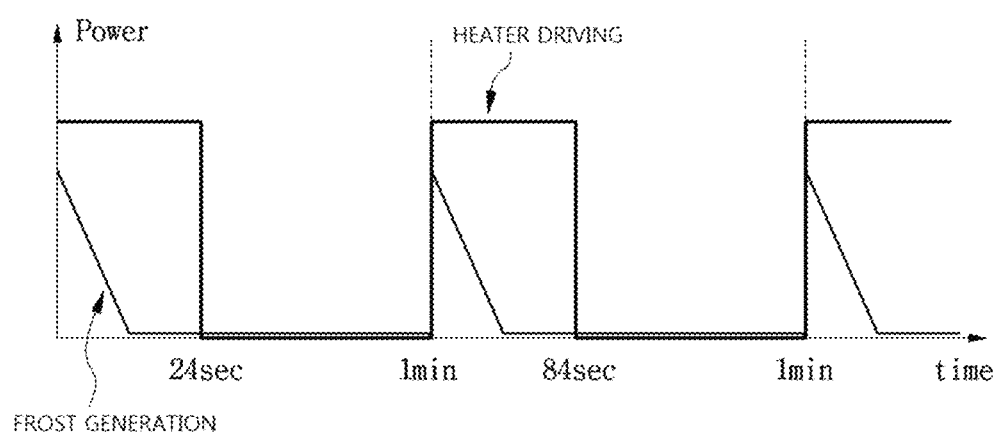
FIG. 12 is a view illustrating a driving operation state of a heater according to the related art.
Figure 13:
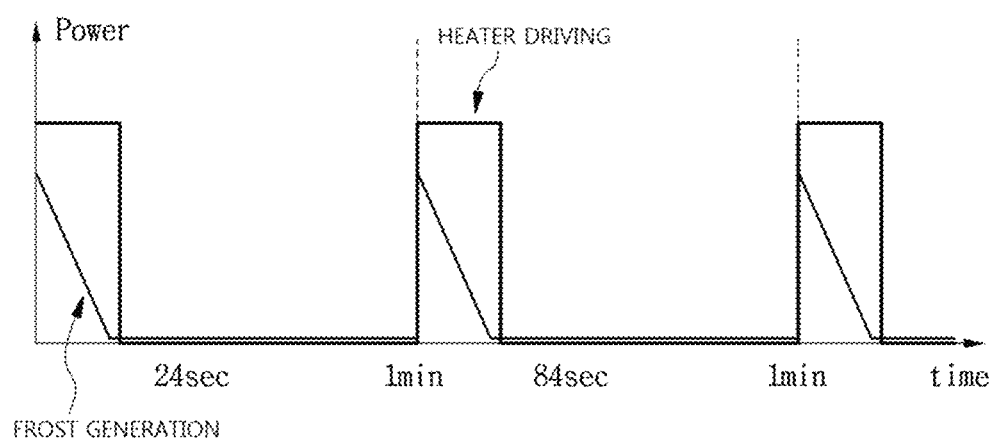
FIG. 13 is a view illustrating a driving operation state of a heater according to an embodiment of the present invention.

FIG. 12 is a view illustrating a driving operation state of a heater according to the related art, and FIG. 13 is a view illustrating a driving operation state of a heater according to an embodiment of the present invention.

Referring to FIG. 12, in the related art, regardless of a generation degree of frost, even after the frost has been removed (in other words, in a state where frost is not generated), a heater was driven for a predetermined time by period.

However, referring to FIG. 13, according to an embodiment of the present invention, a heater is driven at a point of time when the generation degree of the frost exceeds the critical point, and the driving of the heater is stopped at a point of time when the generation degree of the frost drops to the critical point or less.

Figure 14:
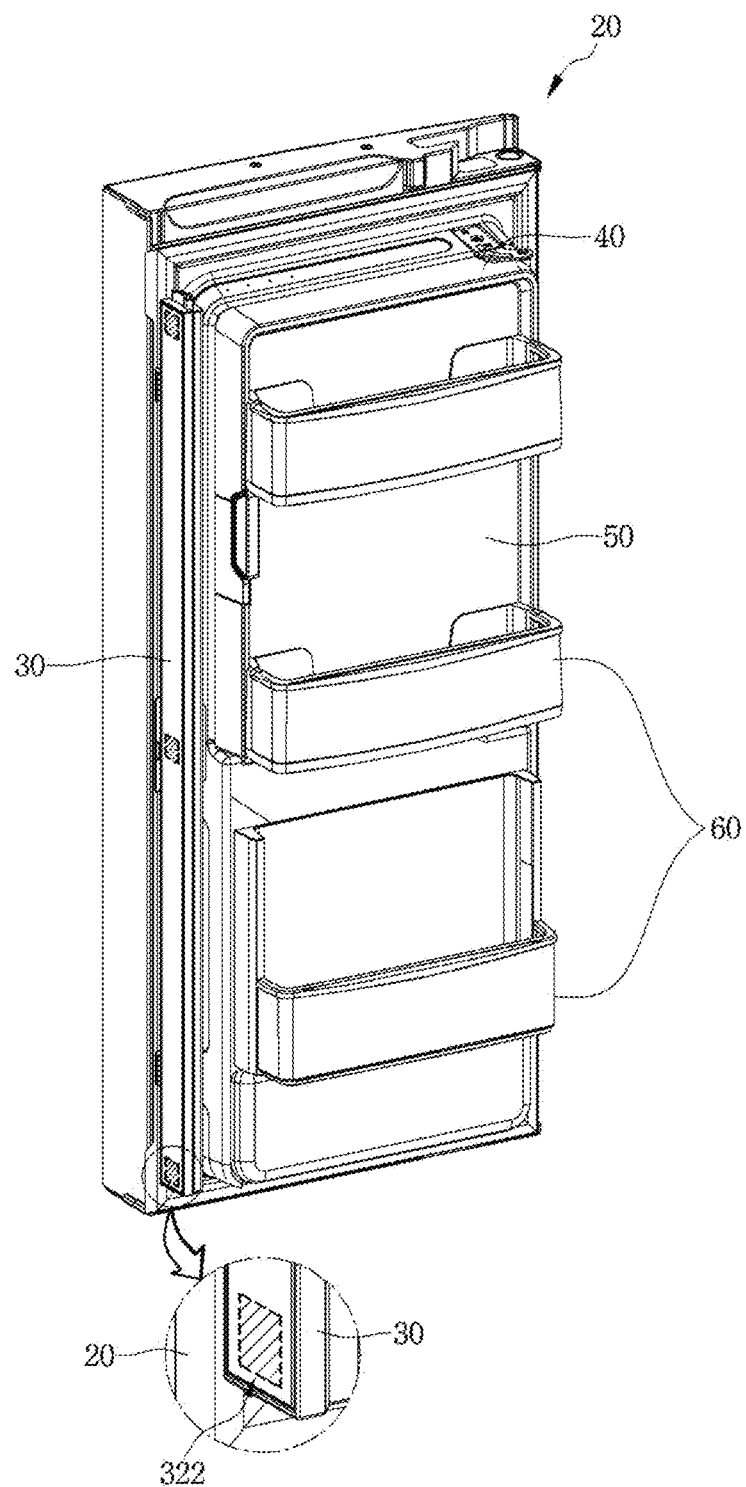
FIG. 14 is a view illustrating an example of mounting a sensing device according to a first embodiment of the present invention.
Figure 15:
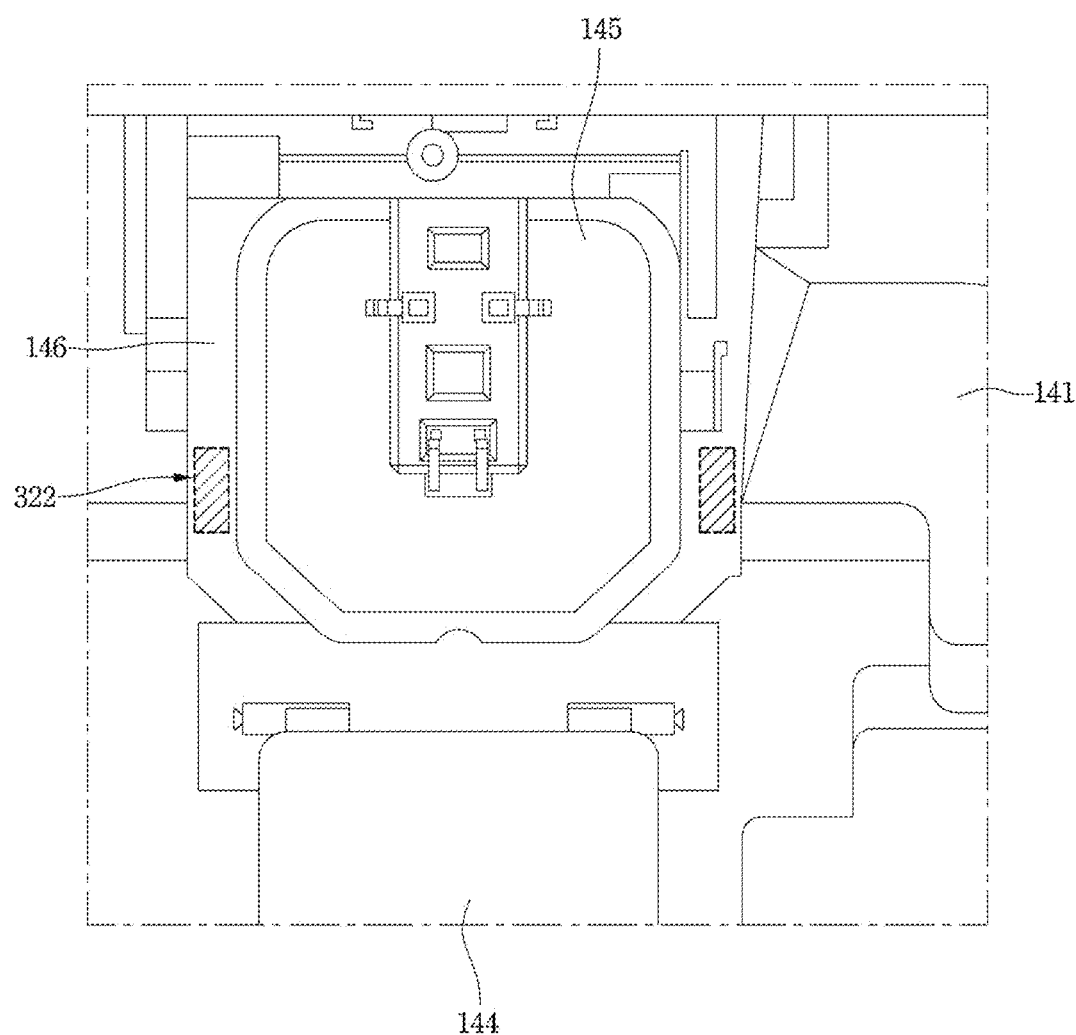
FIG. 15 is a view illustrating an example of mounting a sensing device according to a second embodiment of the present invention.
Figure 16:
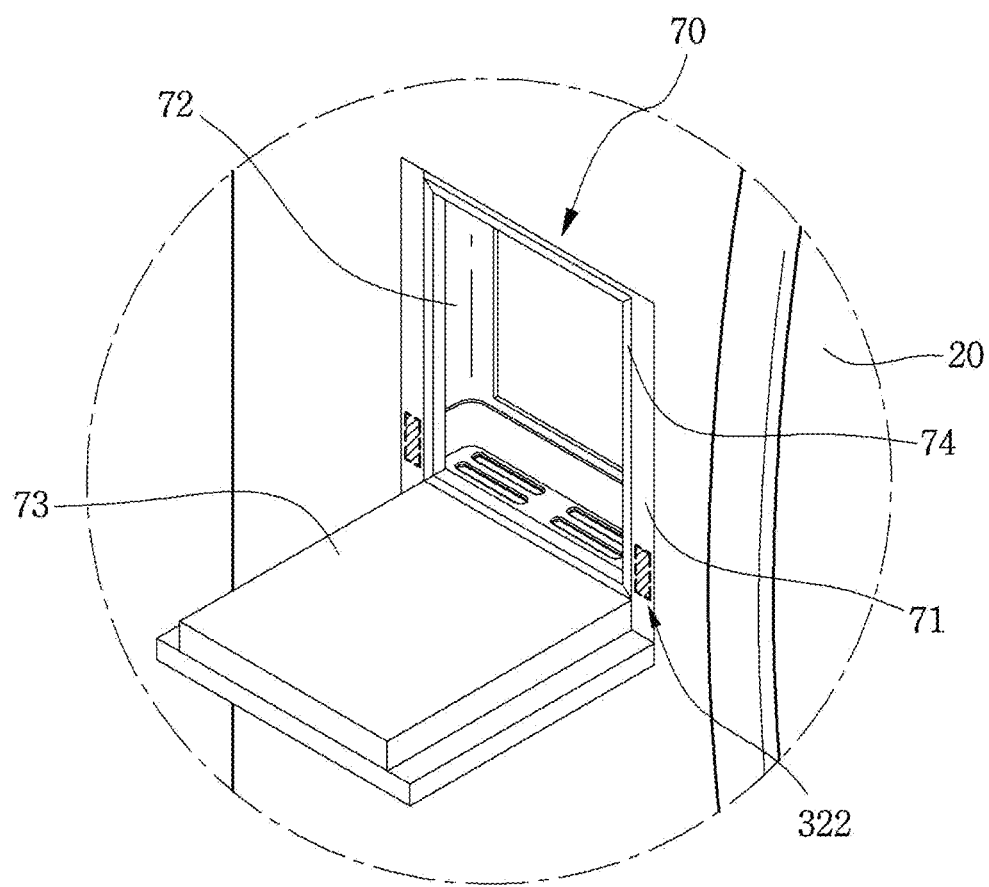
FIG. 16 is a view illustrating an example of mounting a sensing device according to a third embodiment of the present invention.

FIG. 14 is a view illustrating an example of mounting a sensing device according to a first embodiment of the present invention, FIG. 15 is a view illustrating an example of mounting a sensing device according to a second embodiment of the present invention, and FIG. 16 is a view illustrating an example of mounting a sensing device according to a third embodiment of the present invention.

Referring to FIG. 14, an ice-making compartment 40 for making and storing ice may be mounted on a rear surface of a refrigerator compartment door 20 of a refrigerator 1 according to an embodiment of the present invention. In addition, the inner space of the ice-making compartment 40 may be selectively opened and closed by an ice-making compartment door 50. Further, a door basket 60 may be mounted on the rear surface of the refrigerator compartment door 20 and/or on a rear surface of the ice-making compartment door 50.

The refrigerator 1 as described above is equipped with a pillar 30 for preventing the outflow of cold air. In the first embodiment of the present invention, the sensing device 322 may be mounted on the pillar 30 as described above.

Referring to FIG. 15, the refrigerator may include a dispenser 14 provided on a front surface of at least one of the pair of refrigerator compartment doors to allow ice or water to be taken out.

In addition, a dispenser 14 for taking out ice includes a dispenser housing 141. Further, the dispenser housing 141 is recessed backward to a predetermined depth to form a space for accommodating a container. Further, an ice-making compartment 40 is mounted on the rear side of the refrigerator door (the refrigerator compartment door in the embodiment) on which the dispenser housing 141 is mounted. Furthermore, an ice-discharge duct 146 extends from the bottom of the ice-making compartment 40 to an upper surface of the dispenser housing 141.

The diagram is a front view of the dispenser 14 as viewed from the front, illustrating that a damper 145 is mounted at an outlet end of the ice-discharge duct 146.

In more detail, the damper 145 is rotatably mounted at the outlet end of the ice-discharge duct 146 and is rotated in a direction in which the outlet end of the ice-discharge duct 146 is opened by an operation of pressing an ice discharging button 144. In addition, the sensing device 322 according to an embodiment of the present invention may be mounted at the outlet end edge of the ice-discharge duct 146. That is, the condensation sensing unit may be mounted on the edge of the outlet end of the ice-discharge duct 146 which is not covered by the damper 145. In addition, a heater (not shown)

may be buried at the edge of the outlet end of the ice-discharge duct 146 which is not covered by the damper 145.

Further, referring to FIG. 16, a home bar unit may be provided on a front surface of a refrigerator compartment door and/or a freezer compartment door of a refrigerator.

In detail, the home bar unit 70 according to an embodiment of the present invention includes a home bar case 72 mounted on a rear surface of the door to form a food storage space and a home bar door 73 for opening and closing the front opening of the home bar case 72. An opening for allowing access to the home bar case 72 is formed in the refrigerator door where the home bar unit 70 is mounted. Further, a frame 71 is mounted on the inner edge of the opening, and the home bar door 73 is rotatably coupled to the front surface of the frame 71. Furthermore, a gasket 74 is enclosed in the inner edge of the frame 71 to prevent the cool air from leaking out in a state where the home bar door 73 is closed.

The home bar structure may include a refrigerator compartment home bar or a freezer compartment home bar, and the refrigerator compartment home bar may store foods that need to be kept in a refrigerated state such as beverage. An ice bin for ice storage may be installed in the freezer compartment home bar.

Meanwhile, the sensing device 322 according to an embodiment of the present invention may be mounted at the lower end portion of the front surface of the frame 71.

According to an embodiment of the present invention, when frost or moisture is generated greater than a critical point, the power consumption may be reduced by instantly reacting therewith to drive the heater for the necessary time only.

In addition, according to an embodiment, the heater is driven at the time when frost or moisture is generated greater than the critical point, not a periodic driving of the heater, and thus it is possible to efficiently drive the heater scattered in a refrigerator and to minimize unnecessary damping of a cooling effect.

Further, although preferred embodiments of the present disclosure have been shown and described, but the present disclosure is not limited to the particular embodiments mentioned above. The embodiments may be modified in various ways by those of ordinary skill in the art to which the present disclosure pertains without departing from the gist of the present disclosure which is claimed in the claims below, and the modified embodiments should not be understood as being separate from the technical spirit or prospect of the present disclosure.

The invention claimed is:

1. A sensing module comprising:
   a substrate;
   a sensing electrode provided on the substrate;
   a reaction layer provided to cover the substrate and the sensing electrode;
   a driving layer provided below the substrate and electrically connected to the sensing electrode; and
   a protective layer formed to surround the substrate, the driving layer, and the reaction layer,
   wherein the reaction layer includes a carbon micro-coil having a spring shape,
   wherein an impedance value of the reaction layer is changed due to a force applied to the reaction layer by an external contact material and a dielectric constant of the external contact material,
   wherein the sensing electrode provides a sensing signal corresponding to the impedance value to the driving layer,
   wherein the sensing module is accommodated in a pillar rotatably coupled to a first door of a refrigerator and positioned to prevent a leakage of cold air between the first door and an adjacent second door when the first door and the second door are closed, the sensing module extending along an entire inner surface of the pillar to be positioned adjacent to a plurality of hinges rotatably coupling the pillar to the first door, and
   wherein the reaction layer has cross-sectional structure in which carbon fibers are grown in a coil shape.

2. The sensing module of claim 1, wherein the reaction layer is formed from a solution that includes the carbon micro-coil, a resin and a dispersant.

3. The sensing module of claim 1, wherein the reaction layer is provided on the substrate and over the sensing electrode that is formed to have a predetermined thickness.

4. The sensing module of claim 1,
   wherein the sensing module includes a plurality of the sensing electrodes,
   wherein each of the plurality of sensing electrodes includes a first electrode part provided at an edge region of the substrate and a second electrode part extending from one end of the first electrode part in a longitudinal direction of the substrate, and
   wherein an internal angle between the first electrode part and the second electrode part is an obtuse angle.

5. The sensing module of claim 1, further comprising a via formed through the substrate, wherein a first end of the via is connected to the sensing electrode, and a second end of the via is connected to the driving layer.

6. The sensing module of claim 1, wherein the carbon micro-coil has superelasticity to extend to a length that is ten times or more that of an original length of the carbon micro-coil, and
   wherein the reaction layer has a 3D-helical/spiral structure and an amorphous crystal structure.

7. A refrigerator comprising:
   a main body in which at least one storage compartment is formed;
   a first door and a second door to open and close the at least one storage compartment;
   a pillar rotatably coupled to the first door by a hinge and positioned to prevent a leakage of cold air from the storage compartment between the first door and the second door when the first door and the second door are closed, the pillar having an accommodation space therein;
   a sensing device received in the accommodation space inside the pillar and not exposed to an outside of the pillar;
   a heater received in the accommodation space of the pillar and spaced apart from the sensing device by a predetermined space; and
   a shielding plate provided between the sensing device and the heater in the accommodation space of the pillar to space apart the sensing device from the heater,
   wherein the sensing device includes:
      a substrate;
      a sensing electrode formed on an upper surface of the substrate;
      a reaction layer formed on the substrate to bury the upper surface of the substrate and the sensing electrode, the reaction layer being formed of a carbon micro-coil material having an impedance value that changes based on a force applied to the reaction layer by a contact material and a dielectric constant of the contact material;

a driving layer provided on a lower surface of the substrate to sense a change in an impedance of the reaction layer on a basis of a signal transmitted through the sensing electrode; and a protection layer formed to surround the substrate, the driving layer, and the reaction layer, wherein the reaction layer has a cross-sectional structure in which carbon fibers are grown in a coil shape, and wherein the reaction layer of the sensing device faces the heater with the shielding plate interposed therebetween.

8. The refrigerator of claim 7, further comprising a control unit that determines whether more than a threshold quantity of frost or moisture constituting the contact material is present based on a change in the impedance value, and that drives the heater when more than the threshold quantity of frost or moisture is present.

9. The refrigerator of claim 7, wherein the sensing device is provided at at least one of an upper end portion, a center portion, or a lower end portion of the inner surface of the main body.

10. The refrigerator of claim 7, wherein the sensing device extends along an entire inner surface of the pillar.

11. The refrigerator of claim 7, further comprising:
an ice-making compartment mounted on a rear surface of one of the first door or the second door or inside the storage compartment;
a dispenser mounted on a front surface of at least one of the first door or the second door to output ice stored in the ice making compartment; and
an ice-discharge duct that connects a bottom surface of the ice-making compartment and an upper surface of the dispenser,
wherein the refrigerator includes a plurality of sensing devices and a plurality of heaters, and
wherein another one of sensing devices and another one of heaters are accommodated in the ice-discharge duct.

12. The refrigerator of claim 7, further comprising:
a home bar including a frame mounted on an inner rim of an opening of at least one of the first door or the second door, a home bar door rotatably mounted on a front surface of the frame, and a home bar case mounted on a rear surface of the home bar door,
wherein the refrigerator includes a plurality of sensing devices and a plurality of heaters, and
wherein another one of the sensing devices and another one of the heaters are accommodated in the frame included in the home bar.

13. The refrigerator of claim 7, wherein the carbon micro-coil has superelasticity to extend to a length that is ten times or more that of an original length of the carbon micro-coil, and wherein the reaction layer has a 3D-helical/spiral structure and an amorphous crystal structure.

14. A refrigerator comprising:
a main body in which at least one storage compartment is formed;
a first door and a second door to open and close the at least one storage compartment;
a pillar rotatably coupled to the first door by at least one hinge to prevent leakage of cold air from the storage compartment between the first door and the second door when the first door and the second door are closed;
a sensing device mounted inside the pillar and extending along an entire inner surface of the pillar to be positioned adjacent to the at least one hinge; and
a heater mounted inside the pillar and spaced apart from the sensing device by a predetermined distance,
wherein the sensing device comprises:
a substrate;
a sensing electrode formed on an upper surface of the substrate;
a reaction layer formed on the substrate to cover the upper surface of the substrate and the sensing electrode, the reaction layer including a carbon micro-coil having a hydrocarbon-based material with an impedance value that changes depending on frost generation on a surface of the pillar;
a driving layer provided on a lower surface of the substrate and configured to sense a change in impedance of the reaction layer on a basis of a signal transmitted through the sensing electrode; and
a protection layer formed to surround the substrate, the driving layer, and the reaction layer,
wherein the impedance value is changed based on a force applied to the reaction layer by a contact material and a dielectric constant of the contact material, and
wherein the reaction layer has a cross-sectional structure in which carbon fibers are grown in a coil shape.

15. The refrigerator of claim 14, wherein the sensing device is mounted inside the pillar and is not exposed to the outside of the pillar.

16. The refrigerator of claim 14, further comprising:
a via formed through the substrate,
wherein a first end of the via is connected to the sensing electrode, and a second end of the via is connected to the driving layer.

17. The refrigerator of claim 14, wherein the carbon micro-coil has superelasticity to extend to a length that is ten times or more that of an original length of the carbon micro-coil, and
wherein the reaction layer has a 3D-helical/spiral structure and an amorphous crystal structure.

* * * * *